AUTOMATIC VOLUME CONTROL CIRCUIT
Filed May 24, 1947
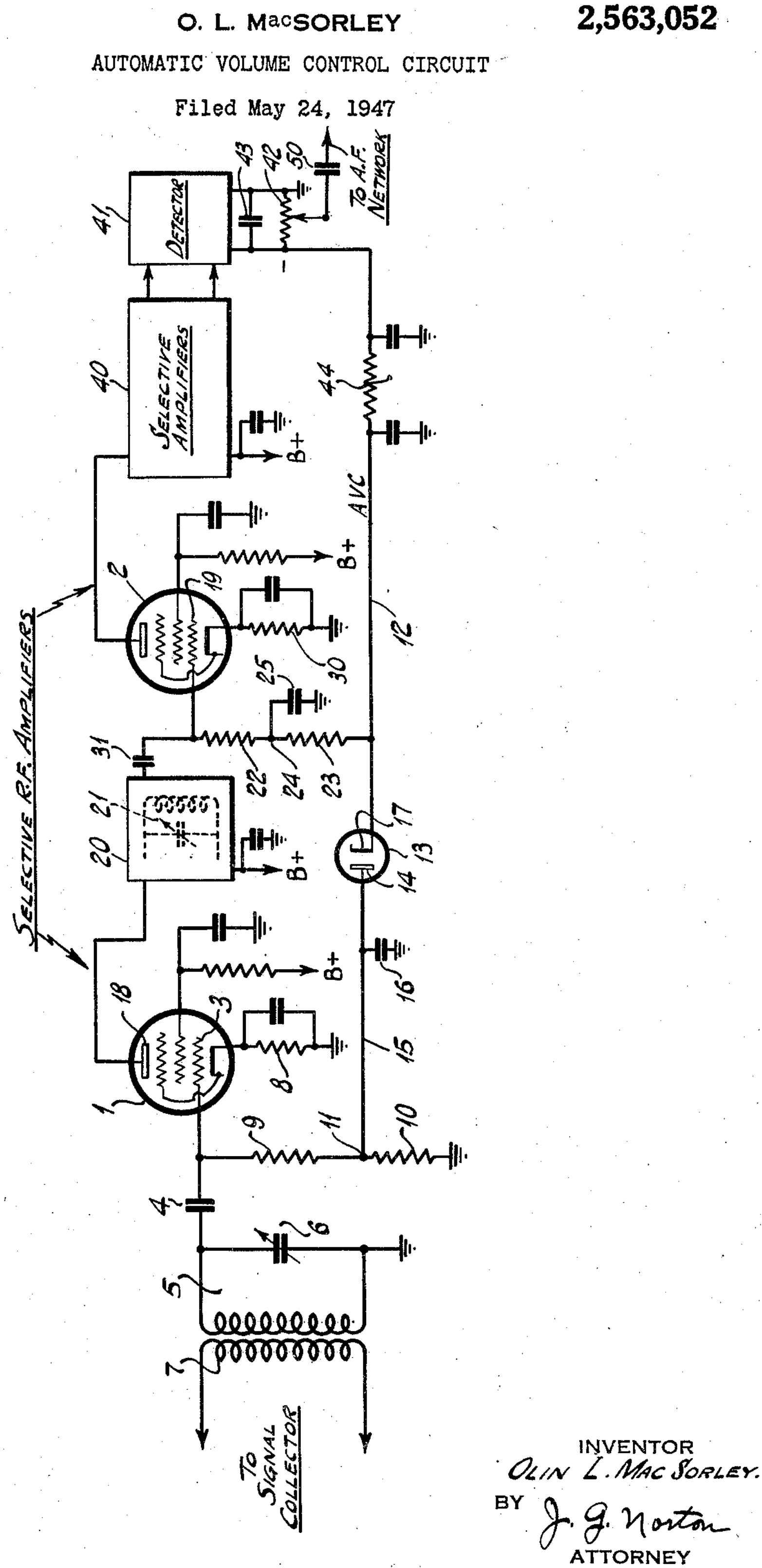
INVENTOR
Olin L. MacSorley.
BY J. G. Norton
ATTORNEY Patented Aug. 7, 1951 2,563,052

UNITED STATES PATENT OFFICE 2,563,052

AUTOMATIC VOLUME CONTROL CIRCUIT

Olin L. MacSorley, Collingswood, N. J., assignor to Radio Corporation of America, a corporation of Delaware Application May 24, 1947, Serial No. 750,208

2 Claims. (Cl. 179—171)

My present invention relates generally to automatic volume control circuits for radio receivers, and more particularly to an improved arrangement for protecting the automatic volume control (AVC) circuit of a receiving system subject to strong signal reception.

It is often desirable in a radio receiver to use a large antenna gain to improve the signal to noise ratio. In receivers equipped with AVC circuits there arises situations where the presence of a strong radio frequency signal may lead to the production of a radio frequency signal voltage at the control grid of the first tube having a greater peak amplitude than the AVC voltage at the grid of the same tube. For example, radio frequency signal voltages of the order of several volts may occur at the antenna of an aircraft receiver when the plane is flying close to another plane, or when it is in close proximity to the transmitter at the airfield control tower. Normally in a receiver having a large gain ahead of the first tube control grid (10 to 20 times), the AVC voltage applied to the grid of the first tube will cause the gain through that tube to change to a loss for large inputs, and the actual radio frequency voltage at the grid of the second tube will be less than that at the control grid of the first tube.

Where, as stated above, the development of a strong signal at the control grid of the first tube attains a greater peak amplitude than the AVC voltage at that grid, grid rectification will take place. As a result a negative direct current voltage will be produced at that grid which is greater than the AVC bias applied over the AVC circuit. Since the control grid of the first tube is connected to the common AVC line all the tubes that normally receive AVC voltage will have applied thereto this more negative voltage. Hence, the gain of the controlled tubes is reduced below that which is required to keep a constant output, and there will result a rapid decrease in output terminating in complete cutoff of the receiver.

There are several ways to deal with this problem. The most obvious is not to apply any AVC voltage to the first tube. However, this is not satisfactory, because under normal operating conditions it is desirable to apply AVC voltage to the first tube. There are other expedients which only partially solve the problem.

In accordance with my present invention, I provide a means of preventing the blocking of the receiver by virtue of high negative voltage on the AVC circuit, but without preventing AVC action on the first tube during normal operating conditions.

It is an object of my invention to provide a uni-directional conductive device in the AVC line between the control grid of the first controlled tube and the control grid of each of the following tubes, the device being conductive when the AVC line is more negative than the control grid of the first tube and being non-conductive when the control grid is more negative than the AVC line.

Specifically, in accordance with my invention the control grid of the first tube of a radio receiver provided with AVC, is connected to the AVC line through a coupling means which will provide a direct coupling between the AVC line and the control grid of the first tube as long as the amplitude of the negative voltage on the AVC line exceeds the peak amplitude of the signal applied to the control grid, but will break this connection whenever the peak amplitude of the signal applied to the control grid becomes sufficiently large to produce by grid rectification a negative direct current voltage on the grid greater than that applied to the AVC line by the usual AVC rectifier.

Still other features and objects of my invention will best be understood by reference to the following description taken in connection with the drawing, in which I have indicated diagrammatically a circuit organization whereby my invention may be carried into effect.

The receiving system shown in the drawing is schematic in representation, since those skilled in the art are fully aware of the manner of constructing a radio receiving system employing AVC, whether it be utilized in connection with amplitude modulated carrier waves, frequency modulated carrier waves or even phase modulated carrier waves. Further it is to be understood that the receiving system is of the type employed in connection with aircraft communication. Specifically, the receiver schematically shown in the drawing is assumed to represent an aircraft receiver.

The numeral 1 denotes the first radio frequency amplifier tube, and numeral 2 designates the second radio frequency amplifier tube. While I have shown these tubes as pentodes, it is to be clearly understood that they may be of any other suitable type. The control or input grid 3 of amplifier tube 1 is shown coupled by a radio frequency coupling condenser 4 to the high alternating potential side of the selective resonant input circuit 5 whose opposite side is grounded.

The numeral 6 designates any suitable frequency selecting means, as, for example, the usual variable capacity device. The primary circuit 7 is to be understood as being connected in the antenna circuit, whether it be a dipole or grounded antenna.

The control grid 3 is returned to the grounded end of a suitably bypassed grid bias resistor 8 over a pair of series-arranged resistors 9 and 10. The junction point 11 of resistors 9 and 10 is connected to the AVC line 12 through a device of unidirectional conductivity. Specifically, I have shown the uni-directional device as a diode 13 whose anode 14 is connected by lead 15 to junction point 11, a radio frequency bypass condenser 16 connecting anode 14 directly to ground. In other words the diode plate 14 is bypassed to ground for all radio frequency signals, while the diode cathode 17 is connected to the AVC lead 12.

The coupling network between the plate 18 of tube 1 and the control grid 19 of amplifier tube 2 is represented as being included in the box 20. It is to be understood that the dotted line resonant circuit 21 may be any suitable form of selective resonant circuit. This circuit may include a frequency selective device which is operated concurrently with the device 6 so as to tune circuits 5 and 21 to a common frequency. The control grid 19 of amplifier tube 2 is connected to the AVC voltage source through series-arranged resistors 22 and 23 whose junction point 24 is bypassed to ground by condenser 25 for all radio frequency signals. The cathode of amplifier tube 2 is connected to ground through a suitably bypassed bias resistor 30. Of course, the selective amplified output of tube 1 is applied through coupling condenser 31 to the control grid 19 of amplifier tube 2.

The box 40 schematically represents additional stages of selective carrier amplification. However, they may include the usual converter stage and intermediate frequency amplifier stages, where the receiver is of the superheterodyne type. Whether the signals received are amplitude modulated or frequency modulated, the receiving system so far as AVC action is concerned will function in substantially the same manner. That is to say, some form of demodulating or detector device 41 will be employed to develop across a load resistor 42 the direct current voltage used for AVC action. The numeral 41 designates a box which schematically represents the detector.

Assuming that the detector is of the diode type, load resistor 42 will be connected in circuit with the diode so as to develop the modulation and direct current voltage components of the rectified carrier energy. Condenser 43 bypasses load resistor 42 for carrier frequency. The ungrounded end of resistor 42 will vary in a negative potential sense relative to ground, and the amplitude of the negative voltage will be proportional to the intensity of the carrier amplitude. AVC lead 12 is connected to the negative end of resistor 42 through filter 44 which functions to suppress all pulsating voltage components in the AVC voltage. The time constant of network 44 is chosen to permit AVC line 12 to act in known manner. The condenser 50 is included in the path which derives the modulation voltage component from across load resistor 42. Specifically, condenser 50 will be connected to the audio frequency amplifier network of the receiver.

The coupling device 13 between lead 15 and AVC lead 12 could just as well be a crystal rectifier, such as one of the type 1N34, whose anode is connected through an isolating resistor to the control grid 3, and a second resistor 10 going from the anode 14 to ground. As long as the AVC lead 12 is more negative than the potential of anode 14 the diode will be conductive, because in that case the cathode 17 is negative with respect to the diode anode 14. Hence, a negative voltage equal to the AVC voltage less the drop across the rectifier 13 will be applied to the grid 3 of amplifier tube 1. If the radio frequency signal at grid 3 becomes sufficiently large to produce, by means of grid rectification, a negative voltage at the anode 14 which is larger than the AVC voltage, then the diode 13 will become non-conductive. This follows from the fact that the anode 14 will be negative with respect to its cathode, and, hence, the diode 13 will not conduct. This will prevent the negative voltage produced by grid rectification at tube 1 from being applied through resistors 22 and 23 to the amplifier control grid 19, and through corresponding resistors to any other of the selective amplifier grids to which AVC is normally applied.

It might be thought that a strong signal could cause the second tube grid 19 to swing sufficiently positive to cause grid rectification in its grid circuit thereby to cause diode cathode 17 to assume a negative potential relative to anode 14, and thus prevent diode 13 from breaking down. This is not so, because normally in a receiver having large gain ahead of the grid of the first tube (10 to 20 times) the AVC bias on the first grid will cause the gain through the first tube to change to a loss for large inputs. The actual radio frequency voltage at the second tube grid, therefore, will be less than that at the first tube control grid. Should, in a special case, the second tube grid draw grid current, then an additional diode can be inserted between grid 19 and AVC line 12.

In normal receiver operation the negative AVC voltage keeps the cathode 17 negative relative to anode 14, and diode 13 is conductive thereby permitting normal AVC operation of the receiver. If, now, a strong radio signal, as of the order of several volts when an aircraft antenna is close to another plane or tower transmitter, causes a peak radio frequency signal at grid 3 which is greater than the sum of the AVC and cathode voltages, grid 3 will rectify and provide direct current voltage across resistors 9, 10. As soon as the anode 14 becomes more negative than AVC line 12, the diode 13 becomes non-conductive which isolates grid 3 from the remainder of the AVC circuit until conditions return to normal.

While this present system has been described as being used with the first tube of a receiver, its application is not limited to this use. The present invention may be used at any point in an amplifier circuit where there is danger of the radio frequency input signal increasing faster than can be taken care of by the AVC circuit. That is, the tube 1 may be preceded by one or more amplifiers which may or may not be controlled by AVC, and which prior amplifier is capable of producing the excessive gain.

While I have indicated and described a system for carrying my invention into effect, it will be apparent to one skilled in the art that my invention is by no means limited to the particular organization shown and described, but that many modifications may be made without departing from the scope of my invention.

What I claim is:

1. The combination, in a radio signal receiver, of a plurality of signal amplification stages connected in cascade relation to each other, means for producing a direct current control potential proportional to signal current amplitude including a single direct current control path, circuit means connecting said direct current control path to each of said amplification stages whereby the gain of said amplification stages is varied in inverse relation to the amplitude of said signal current, and a uni-directional conducting device connected serially in said single direct current control path between said circuit means connecting the first of said amplification stages and the second of said amplification stages to the said direct current control path for effectively opening said control path upon signal overload of the first of said amplification stages whereby excessive control voltages developed by the first of said amplification stages are not applied to succeeding amplification stages.

2. In a signal amplifier system having a plurality of signal amplification stages connected in cascade relation to each other, each of said stages including an input grid, the combination of a control voltage circuit comprising, means for producing a direct current control potential proportional to signal current amplitude, filter means connected to said control voltage producing means whereby fluctuations appearing in said control voltage are reduced, individual means including additional filter means connecting said first named filter means to the input grids of the second and succeeding stages whereby said filtered direct current control potential is applied to said grids for varying the gain of said amplification stages in inverse relation to the amplitude of said signal current, circuit means connected to the input grid of the first stage, and a uni-directional conducting device serially connected between said first filter means and said circuit means, said uni-directional conducting device being so poled as to be non-conductive when said filtered direct current control voltage is positive with respect to voltage developed in the last named circuit means due to grid rectification.

OLIN L. MacSORLEY.

REFERENCES CITED

The following references are of record in the file of this patent:

UNITED STATES PATENTS

| Number | Name | Date |
|---|---|---|
| 2,073,486 | Koch | Mar. 9, 1937 |
| 2,144,304 | Braden | Jan. 17, 1939 |
| 2,199,350 | Shofstall | Apr. 30, 1940 |